Patented Aug. 23, 1938

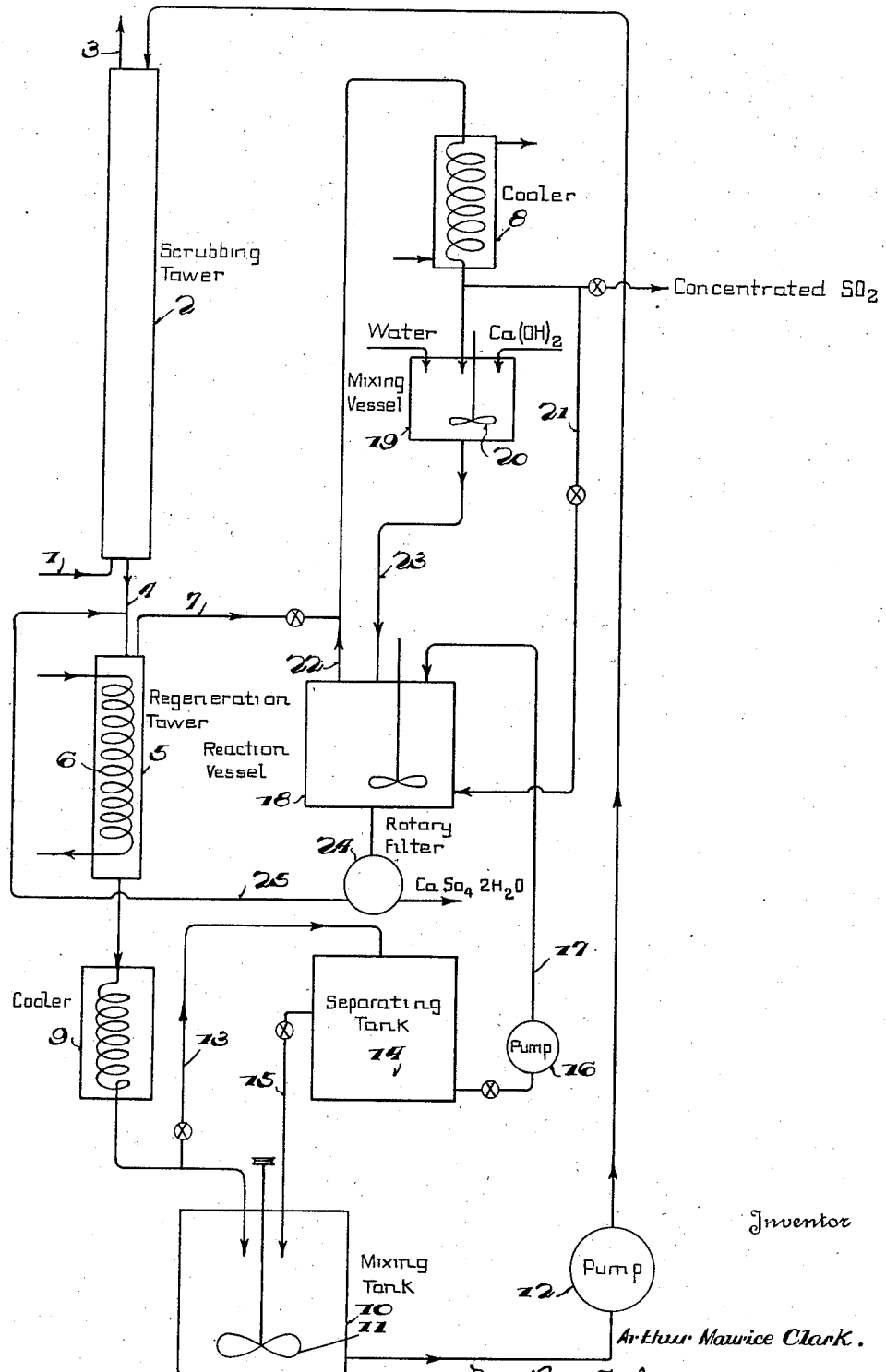

2,128,027

UNITED STATES PATENT OFFICE 2,128,027

RECOVERY OF SULPHUR DIOXIDE FROM GAS MIXTURES

Arthur Maurice Clark, Norton-on-Tees, England, assignor to Imperial Chemical Industries Limited, a corporation of Great Britain Application April 14, 1938, Serial No. 202,065
In Germany and Sweden February 9, 1937

10 Claims. (Cl. 23—178)

This application is a continuation, in part, of application Serial Number 126,303, filed 17th February, 1937.

This invention relates to the recovery of sulphur dioxide from gas mixtures containing the same, by means of a liquid absorbent which is used in a cycle comprising an absorption stage and a regeneration stage. In the absorption stage the gas mixture from which sulphur dioxide is to be recovered is brought into contact with the liquid absorbent in any suitable apparatus affording large surfaces of contact between the gas and the liquid, whereby the liquid absorbent becomes charged with sulphur dioxide. In the regeneration stage the liquid absorbent charged with sulphur dioxide is treated for removal of sulphur dioxide by heating and/or reduction of pressure, whereby concentrated sulphur dioxide is expelled and the liquid absorbent is restored to substantially its original condition. The regenerated liquid absorbent is then returned to the absorption stage.

More especially the invention relates to the recovery of sulphur dioxide as described in the preceding paragraph with the aid of a liquid absorbent consisting of a mixture of an aqueous medium and at least one substantially water-insoluble liquid organic base of the kind typified by aniline, quinoline, or crude xylidine. When a mixture or emulsion of such an organic base and water is treated with sulphur dioxide, a sulphite of the organic base is formed which is soluble in water. Thus, while the original liquid absorbent consists of two separate liquid phases, as more and more sulphur dioxide is absorbed the organic base phase gets less and less and finally all of it goes into solution in the aqueous medium. When the liquid absorbent charged with sulphur dioxide is heated or subjected to reduced pressure, the sulphite of the organic base is decomposed, liberating sulphur dioxide and reforming the organic base, which is precipitated from solution. Thus the expulsion of sulphur dioxide from the charged absorbent causes the separation of the liquid into the original two separate phases of aqueous medium and organic base.

The above process is not perfectly reversible owing to the conversion of a portion of the sulphur dioxide into sulphur trioxide. Thus the amount of sulphur dioxide recovered during the regeneration stage falls short of that absorbed during the absorption stage. Moreover, the sulphuric acid formed combines with a portion of the organic base to form a sulphate, which will not react with sulphur dioxide under the conditions of the absorption stage, so that the efficiency of the absorbent gradually diminishes as the sulphate accumulates. In some cases further sulphate may be formed as a result of the presence of sulphur trioxide in the gases from which sulphur dioxide is to be recovered. The sulphate of the organic base dissolves in the aqueous medium.

In order to maintain the efficiency of the absorbent at a high level without adding fresh sorbent, it is necessary to regenerate the organic base from the sulphate thereof by removing the sulphate ions from the system at a rate equal to that of their production. This may be done by treating the absorbent with an alkali which is a stronger base than the organic base and which therefore displaces the organic base radical, or by treating the absorbent with a substance which forms an insoluble sulphate and which does not leave in solution any radical which is non-volatile under the conditions of the regeneration stage.

This invention has as an object to devise means whereby the portion of the organic base bound as sulphate may be regenerated in a more convenient and economical manner than has hitherto been suggested. A further object is to devise a means whereby the whole liquid absorbent may be regenerated by treating only a fraction thereof. A further object is to devise a means whereby the regeneration can be effected without causing a precipitate to be formed in the presence of undissolved organic base.

Further objects will appear hereinafter.

These objects are accomplished by the following invention.

I have found that sulphate ions can be removed from the system by treating the aqueous medium with a calcium compound in the presence of dissolved $SO_2$. Further in the presence of a substantial amount of neutral sulphate (such as sodium sulphate) the addition of further quantities of calcium compound will cause the production of sulphites of the base of the neutral sulphate (such as sodium sulphite) which are capable of decomposing any organic base sulphate with which it may subsequently come in contact.

According to the invention at least a portion of the aqueous medium is separated from the organic base after the regeneration stage and is treated, in the presence of substantial amounts of dissolved sulphur dioxide and of neutral sulphate, with a calcium compound which does not leave in solution any non-volatile acid radical, after which the aqueous medium is separated from the precipitated calcium sulphate and is utilized, in admixture with the organic base, for absorbing further quantities of sulphur dioxide from the initial gas mixture.

One method of carrying out the invention is illustrated in the accompanying diagrammatic flowsheet.

The sulphur dioxide containing gases pass through the inlet pipe 1 into the scrubbing tower 2 where the sulphur dioxide is absorbed, the waste gases, substantially free from sulphur dioxide leaving by the pipe 3. The homogeneous liquor containing the sulphur dioxide leaves the scrubbing tower by the pipe 4 and passes to the regeneration tower 5, which is heated by steam passing through the coil 6, whereby the sulphur dioxide is regenerated and is led away through pipe 7 and the cooler 8. Normally, the regenerated liquor passes via the cooler 9, which may be in the form of a heat interchanger in which the saturated liquor entering the regeneration tower is preheated, to the mixing tank 10 which is provided with a stirrer 11 to ensure that a uniform mixture of sodium sulphate solution and the water-insoluble base is fed by the pump 12 to the scrubbing tower 2. When it is desired to remove undesirable sulphate, a portion of the liquor leaving the cooler 9 is bled off through the pipe 13 into a separating tank 14, where the water-insoluble base and the solution of sodium sulphate, which also contains some sulphate of the organic base, separates into two layers. The organic base layer is fed to the mixing tank 10 through the pipe 15, while the aqueous layer is passed through the pump 16 and the pipe 17 into the reaction vessel 18. Meanwhile, in the mixing vessel 19, fitted with the stirrer 20, the requisite amount of calcium hydroxide has been made into a slurry with condensate from the cooler 8, supplemented if necessary with additional water. Sulphur dioxide is bled off from the main supply through the pipe 21 into the reaction vessel 18, until sufficient is present in the aqueous liquor, excess sulphur dioxide rejoining the main stream through pipe 22. The slurry is then fed through pipe 23 into the reaction vessel 18 whereby gypsum is precipitated. The liquor is then filtered in a rotary filter 24, the filtrate being returned to the absorption system through the pipe 25.

If calcium carbonate were used, the exit gases leaving the reaction chamber are contaminated with $CO_2$ and so pipe 22 would be led into the absorption tower.

The invention is also illustrated, but not limited, by the following example.

Example

A regenerative absorption process for $SO_2$ is operated with an absorbent consisting of a mixture of 20 cubic metres of aniline and 20 cubic metres of an aqueous solution of sodium sulphate containing 100 grams of $Na_2SO_4$ per litre. During the regeneration stage when the $SO_2$ is driven off from the absorbent by heating, the mixture separates into two layers.

When the process has been carried on for so long that the aqueous layer contains organic base sulphate equivalent to 5 grams of sulphuric acid per litre, 5 cubic metres of the aqueous layer are withdrawn from the system after the regeneration step, and are treated with concentrated $SO_2$ so that the liquor contains about 30 grams of $SO_2$ per litre. This liquor is then treated at room temperature with 100 kgs. of calcium carbonate in the form of a slurry with water, thereby precipitating as gypsum not only the organic base sulphate contained in the said 5 cubic metres of liquor, but also an amount of sulphate radicle equivalent to the organic base sulphate in the remainder of the absorbent, the precipitated sulphate radicle being replaced by sulphite radicle.

The precipitated gypsum is removed by filtration and the filtrate is returned to the main body of the absorbent, whereupon the sulphite reacts with the remainder of the organic base sulphate contained in the liquor, forming sodium sulphate and the sulphite of the organic base. In this way the organic base sulphate content of the whole of the absorbent is reduced to zero.

Examples of suitable calcium compounds for use in carrying out the invention are calcium oxide, hydroxide, carbonate and sulphite, but it will be understood that any calcium compound may be used which will react with the aqueous medium containing dissolved sulphur dioxide and neutral sulphate, to precipitate calcium sulphate without leaving in solution any acid radicle which is non-volatile under the conditions of precipitation or of subsequent use of the liquor in the recovery of sulphur dioxide.

One advantage of having a substantial amount of dissolved sulphur dioxide present in the aqueous medium to be treated with the calcium compound is that the sulphur dioxide prevents precipitation of any organic base as a result of the decomposition of dissolved sulphate of the organic base. Any organic base liberated in this way immediately forms a soluble sulphite. If the organic base were allowed to separate it would tend to be removed with the precipitate of calcium sulphate, necessitating one or more expensive recovery steps.

Another advantage of having a substantial amount of dissolved sulphur dioxide present in the aqueous medium to be treated with the calcium compound is that it facilitates the reaction by greatly increasing the concentration of calcium ions owing to the formation of the soluble calcium bisulphite. If sulphur dioxide is not present the solubility of the calcium compound is very small, and consequently precipitation of calcium sulphate by reaction between the added calcium compound and the sulphate of the organic base is extremely slow.

Further, when a substantial concentration of both neutral sulphate, e. g., sodium sulphate, and of dissolved sulphur dioxide exists in the liquor, the following reaction will take place on addition of a calcium compound such as calcium carbonate:

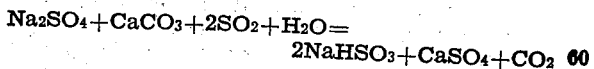

$$Na_2SO_4 + CaCO_3 + 2SO_2 + H_2O = 2NaHSO_3 + CaSO_4 + CO_2$$

Corresponding reactions will occur in the case of other neutral sulphates than sodium sulphate, and other calcium compounds than calcium carbonate which do not leave non-volatile radicles in solution. Thus, within the limits imposed by the concentrations of neutral sulphate and of dissolved sulphur dioxide, any desired amount of bisulphite can be formed in the liquor by adding the appropriate amount of calcium compound. If a portion only of the aqueous medium separated from the organic base after the regeneration stage is treated in this way, it is possible to precipitate an amount of calcium sulphate equivalent to the organic base sulphate in the main body of liquor as well as in the said portion. Then when the treated liquor, from which the precipitate of calcium sulphate has been removed, is returned to the main body of liquor in the absorption-regeneration process the bisulphite which it contains will react with the remaining sulphate of the organic base forming a sulphite of the organic base and a neutral sulphate, e. g., sodium sulphate. Thus the whole of the organic base bound as sulphate may be regenerated by treatment of only a portion of the aqueous medium, provided that this contains substantial amounts of neutral sulphate and of dissolved sulphur dioxide as mentioned.

Various neutral sulphates may be employed in carrying out the invention; sodium sulphate, potassium sulphate and ammonium sulphate are among the most convenient. The neutral sulphate may be added to the aqueous medium at the start of the process, or it may be added to the first portion of the aqueous medium which is withdrawn for treatment with the calcium compound. Alternatively, the desired neutral sulphate content of the liquor may be attained by adding an equivalent amount of alkali, e. g., sodium carbonate, sodium hydroxide or ammonia, to the aqueous medium, either at the start or in portions at intervals according to the rate of formation of the undesirable organic base sulphate.

The concentrations of neutral sulphate and of dissolved sulphur dioxide in the aqueous medium to be treated with the calcium compound may be varied within wide limits, but as previously stated it is preferred to work with such concentrations that by treatment of a portion only of the aqueous medium, an amount of calcium sulphate equivalent to the organic base sulphate in the whole of the absorbent may be removed. In general the aqueous medium should contain at least 50 grams per litre of neutral sulphate, and at least 10 grams per litre of dissolved sulphur dioxide when the calcium compound is added. In many cases it will be convenient to saturate, or nearly saturate, with sulphur dioxide at 1 atmosphere pressure the aqueous medium to be treated with the calcium compound.

The temperature at which precipitation of calcium sulphate is effected is advantageously about room temperature, although higher temperatures may be used if care is taken that the solution does not lose too much sulphur dioxide. Below about 60° C. the calcium sulphate precipitates in the form of gypsum, $CaSO_4.2H_2O$, which forms relatively large and easily filterable crystals.

The organic base sulphate in the aqueous medium may be allowed to accumulate to any desired concentration before undertaking its regeneration. For example, it may be as high as 10 grams per litre, reckoned as free sulphuric acid. It is advantageous, however, to maintain the concentration of organic base sulphate at zero or at a low value, e. g., equivalent to 0.25 gram of free sulphuric acid per litre, since with higher concentrations of the organic base sulphate the efficiency of the sulphur dioxide absorption-regeneration process decreases.

As many apparently widely different embodiments of this invention may be made without departing from the spirit and scope thereof, it is to be understood that I do not limit myself to the specific embodiments thereof except as defined in the appended claims.

I claim:

1. A process for the recovery of $SO_2$ from a gas mixture containing the same, comprising bringing said gas mixture into contact with an absorbent consisting of a mixture of an aqueous medium and at least one substantially water-insoluble liquid organic base, thereafter removing the $SO_2$ from the absorbent, whereby the aqueous medium and the organic base form separate liquid phases, separating said phases, treating at least a portion of the aqueous medium so separated, in the presence of substantial amounts of dissolved $SO_2$ and of neutral sulphate, with a calcium compound adapted to precipitate calcium sulphate and which does not leave in solution any non-volatile acid radicle, separating the aqueous medium from the precipitated calcium sulphate and utilizing it, in admixture with said organic base and any untreated aqueous medium, for absorbing further quantities of $SO_2$ from said gas mixture.

2. A process as set forth in claim 1, in which said aqueous medium contains at least 50 grams of neutral sulphate per litre.

3. A process as set forth in claim 1, in which said water-insoluble liquid organic base is selected from the class consisting of aniline, quinoline and xylidine.

4. A process as set forth in claim 1, in which said neutral sulphate is selected from the class consisting of sodium sulphate, potassium sulphate and ammonium sulphate.

5. A process as set forth in claim 1, in which said calcium compound is selected from the class consisting of calcium oxide, calcium hydroxide, calcium carbonate and calcium sulphite.

6. A process for the recovery of $SO_2$ from a gas mixture containing the same comprising bringing said gas mixture into contact with an absorbent consisting of a mixture of an aqueous medium containing a substantial amount of a neutral sulphate and at least one substantially water-insoluble liquid organic base, thereafter removing $SO_2$ from the absorbent, whereby the aqueous medium and the organic base form separate liquid phases, separating said phases, withdrawing a portion of the aqueous medium so separated, recirculating the remainder of said aqueous medium and employing it together with the organic base, for absorbing further quantities of $SO_2$ from said gas mixture, dissolving a substantial amount of $SO_2$ in said withdrawn portion of the aqueous medium and then treating it with a calcium compound adapted to precipitate calcium sulphate and which does not leave in solution any non-volatile acid radical, separating the aqueous medium from the precipitated calcium sulphate and returning it to the process.

7. A process for the recovery of $SO_2$ from a gas mixture containing the same comprising bringing said gas mixture continuously into contact with an absorbent used in a cycle comprising an absorption stage and a regeneration stage, said absorbent consisting of a mixture of at least one substantially water-insoluble liquid organic base and an aqueous medium containing a substantial amount of neutral sulphate, withdrawing from the regeneration stage a portion of the aqueous medium separated from the organic base, and treating it with a calcium compound adapted to precipitate calcium sulphate and which does not leave in solution any non-volatile acid radical, said treatment being effected in the presence of at least sufficient neutral sulphate and $SO_2$ to form bisulphite in amount equivalent to the added calcium compound, separating the aqueous medium from the precipitated calcium sulphate and returning it to the process.

8. A process as set forth in claim 7, in which the amount of calcium compound added to the withdrawn portion of the aqueous medium is equivalent to the organic base sulphate in the whole of the aqueous medium.

9. A process as set forth in claim 7, in which the concentration of organic base sulphate in the aqueous medium immediately before withdrawal of a portion thereof for treatment with the calcium compound does not exceed that equivalent to 0.25 gm. of sulphuric acid per litre.

10. In a process for the recovery of $SO_2$ from a gas mixture containing the same comprising bringing said gas mixture into contact with an absorbent used in a cycle comprising an absorption stage and a regeneration stage, said absorbent consisting of a mixture of at least one substantially water-insoluble liquid organic base and an aqueous medium containing a substantial amount of neutral sulphate, periodically withdrawing from the regeneration stage, when the concentration of organic base sulphate in the aqueous medium has become appreciable but before it exceeds a value equivalent to 0.25 gm. of sulphuric acid per litre, a portion of the aqueous medium separated from the organic base, and treating it with a calcium compound adapted to precipitate calcium sulphate and which does not leave in solution any non-volatile acid radical, said treatment being effected in the presence of sufficient neutral sulphate and $SO_2$ to form bisulphite in amount equivalent to the added calcium compound, separating the aqueous medium from the precipitated calcium sulphate and returning it to the process.

ARTHUR MAURICE CLARK.